(12) United States Patent
Matthews, III (10) Patent No.: US 8,540,074 B1
(45) Date of Patent: Sep. 24, 2013

(54) REUSABLE MULTI-FUNCTIONAL PAD/FILTER DEVICE

(76) Inventor: Lewis Matthews, III, Detroit, MI (US)

( * ) Notice: Subject to any disclaimer, the term of this patent is extended or adjusted under 35 U.S.C. 154(b) by 139 days.

(21) Appl. No.: 13/193,047

(22) Filed: Jul. 28, 2011

(51) Int. Cl.
*B65D 1/24* (2006.01)
*B65D 1/36* (2006.01)
*B65D 85/00* (2006.01)
*B65D 81/26* (2006.01)
*B01D 29/00* (2006.01)
*B01D 39/00* (2006.01)

(52) U.S. Cl.
USPC ........... 206/204; 210/488; 210/489; 210/490; 210/491; 210/502.1; 220/556

(58) Field of Classification Search
None
See application file for complete search history.

(56) References Cited

U.S. PATENT DOCUMENTS

| | | |
|---|---|---|
| 4,950,524 A | 8/1990 | Hacker |
| 5,094,869 A | 3/1992 | Brown, Jr. |
| 5,414,248 A | 5/1995 | Phillips |
| 6,274,229 B1 | 8/2001 | Weidner et al. |
| 6,488,977 B1 | 12/2002 | Allen |
| 7,249,686 B1 * | 7/2007 | Aesquivel ..................... 220/556 |
| 2002/0185013 A1 | 12/2002 | London |
| 2006/0288999 A1 | 12/2006 | Crawford |
| 2012/0003372 A1 * | 1/2012 | Versteylen et al. ........... 426/392 |

* cited by examiner

*Primary Examiner* — Benjamin Kurtz (57) ABSTRACT

A reusable multi-functional pad/filtration device for providing an easy and unique way to absorb fluids from raw, thawed, or cooked foods. The device features two outer layers that sandwich two middle layers and an absorbent gasket. The gasket is positioned between the two middle layers. Borders are disposed on each side edge of the device. The device may be used in combination with a holding system that includes a base and a serving tray.

17 Claims, 5 Drawing Sheets

REUSABLE MULTI-FUNCTIONAL PAD/FILTER DEVICE

FIELD OF THE INVENTION

The present invention is directed to absorbent materials and devices, more particularly to a reusable multi-functional pad/filtration device, which can remove or filter fluids and other waste material from foods before being consumed.

BACKGROUND OF THE INVENTION

The present invention features a reusable multi-functional pad/filtration device (a reusable "absorbing filter pad device"). The device can be used for many purposes including but not limited to allowing a user to remove excess liquid from his/her food in some embodiments, the device is recyclable.

The device features an absorbent layer (middle layer) and two outer layers. The middle layer may feature two layers with an absorbent gasket in the middle of the two layers. The device is made with borders to help harness fluids. The borders can be found on outer edges of the device. The borders may be made from similar materials as the top and bottom layers. The borders can be permeated by a clipping method, a staple method, a glue method, a thermal setting method, a torch design method, or a punch-hole method. The borders can be shaped into a design by a method including a water jet cut method, a knife cut method, and/or a torch design method.

The device's ability to be reused and used for multiple functions creates uniqueness. The device offers the end user an array of benefits at his/her disposal. The device is suitable for home and commercial use. The device (filtration system of the device) of the present invention may even allow for capturing of oil from water supplies during an oil spill, and oil can be extracted from the filter/pad to be used. The device may be constructed from materials comprising recyclable synthetic fibers such as cellulose fiber and/or wood fiber.

The present invention includes a holder system (e.g., a serving tray or base tray and a base). The base of the holder system has drawers for storing used or unused filter/pads, and the serving tray (or base tray) of the holder allows food to be placed on a table or counter (or other location). Fluid strains to the bottom below the holder. The holder system of the present invention can be hand washable as well as dishwasher safe. This holder system of the present invention can also be utilized as a storage/serving basket.

The present invention can be used for a variety of purposes, for example to remove/filter non-healthy fluids from food whether the food is fried, frozen, grilled, broiled, rinsed, sautéed, steamed, thawed, etc. The present invention can also be used as a multi-function pad, for example the device provides a filtration process in multiple applications. The present invention's outer layers (e.g., top and bottom layers) can be derived from several materials. For example, in some embodiments, the device is constructed from a material comprising recyclable fibers such as wood fiber and/or cellulose fiber. Other material may include metal, polymers, brass, copper, numex, aluminum, and polyester, and polyethylene terephthalate (PET). These materials may be made into the screen then fitted with sizable holes and/or slits (e.g., wire mesh). The middle layers can be made from non-woven material, which is comprised of loosely arranged fibers, such as Batt, to harness fluids. Examples of Batt material include a diaper innards (inside) and numerous blankets. The present invention's cover layers can be comprised with design technology on center of top and bottom layer accomplished using methods such as stitching, torch design, and thermal fusing.

The designs centered on the device create sturdiness within the device, which makes the device durable by preventing disintegration of fluff-batt (middle layer) instead of compressing the middle layer. This reusable grease/waste filtration device has a thickness to fulfill its design function with a diameter of any size to deliver its usage when requested.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention can be used for multiple purposes. For example, in some embodiments, the device is used under carpets as padding, used as padding for leather seats in the winter/summer (e.g., thermal insulation), and used as a workout pad minimizing perspiration. The device can be used as a mechanic's pad when lying underneath a vehicle. The device can be used as a working walking or stand-on pad (e.g., in machine shops, production or manufacturing plants, when cooking/washing dishes, etc.). For example, greasy parts can be stored on top of the device, the device can help catch grease while cooking to help prevent greasy surfaces, the device can prevent slippery surfaces from water splashing when doing dishes, the device can provide comfort when standing on top of it. The device can even be used as a mouse pad or a Frisbee. The device can be used as a sound reduction/barrier for noisy situations, e.g., music rooms, noisy neighbors. The device can be used as a restaurant fast food tablemat or as a fast food/restaurant tray (e.g., serving any grease soiled foods, finger food, etc.). The device can be used as a kitchen utensil holder. The device can be used as clean-up pads at farms or animal stalls, for example for farm animal feces clean up. The device can be used at veterinary hospitals for surgery waste control or in animal shelters of all sorts. The device can serve as a vehicle liner, for example placed in the bottom of the trunk for tools and/or oily parts. The device can be used as a liner for pick-up trucks. The device can be used as moving company pads to cushion fragile valuables during the moving process. The device can be used as a pad/serving tray for hot pizza. The device can be used when changing oil or removing replacing auto parts. The device can be used as a pad for vomit. The device can be used during tailgating parties, serving as a food serving pad. The device can be used to separate oil from water. The device can be used as a sitting pad when wet clothes are present to help prevent mold and mildew build up. The device can be used as window padding for homes/business to help keep out the cold during the winter and keep in the cool air during the summer. The device can be used as makeshift earmuffs. The device can be used by soccer moms when transporting children that have soggy bottoms. The device can be used as a microwave food plate and/or food cover. The device can be used in the bottom of a pet's area or in an infant's crib. The device can be used as a mop or broom. The device can be used for filtration in car filter systems, e.g., air, gas, oil, etc. The device can be used to help remove contamination in the home (residential or commercial) filtration systems. The device can be used as a filter for electronic devices such as computers and car engine computers. The device can become a makeshift air freshener with added designs. The device can be a sunscreen for vehicles. The device can serve as a sweatband for humans or animals. The device can be used as back or arm padding. The device can be used as padding for camping (for sleeping). The device can be an inner sole for various types of shoes. The device can be used to provide a resting area for hot cooking utensils. The device can be used as an oven glove. The device can be a chair cushion. The device can be a shoe/boot holder for dirty shoes (e.g., a shoe mat). The device can be used as a floor mat placed in front of cooking appliances to catch foreign particles and/or liquid waste during cooking. The device can be a hat. The device can be used as an oil-spill filter (e.g., ocean liner spills). The device can help with thawing food (e.g., to help capture up liquid from thawing food). The device can be used as a food mat for babies, disabled persons, seniors, and toddlers. The device can be used as an absorbent table for diaper changing. The device can be used as a filtration cover for bedwetting. The device can be used as a surgical table disposal pad at medical facilities. The device can be used as a disposable diaper for animals. The device can be used as cushioning on boat seats. The device can be used as an airplane pillow. The device can be used as an ashtray pad. The device can be used when eating to catch crumbs (or to wipe hands, etc.).

The device of the present invention is heat resistant and dishwasher safe. The device can be created with decorative patterns and shapes.

The present invention also features a tray (e.g., part of the "holder system"). The tray (serving tray) can be aluminum, plastic, or other metal. The tray offers options to prevent movement (e.g., retractable legs attached to tray, rubber feet attached to the legs). The tray also offers options to store food and serve food.

The present invention features a system comprising a holder system 500 and an absorbing filter pad device 100. The holder system 500 comprises a base 510 having an inner cavity and a drawer 520 slidably disposed in a first side of the base 510, the drawer 520 can slide in and out of the inner cavity; and a serving tray 610 having a bottom surface 616, sides, an inner cavity, and an open top, the open top provides access to the inner cavity, a bottom lip 640 extends downwardly from outer edges of the bottom surface 616 of the serving tray 610, the bottom lip 640 engages a the top surface 515 of the base 510 forming a gap between the top surface of the base 510 and the bottom surface of the serving tray 610, a mesh layer 618 is disposed in the inner cavity of the serving tray 610 above the bottom surface 616, the mesh layer 618 creates a bottom space 690 between the mesh layer 618 and the bottom surface 616 of the serving tray 610, a slot 680 is disposed in a side of the serving tray 610 near the bottom surface 616, the slot 680 provides access to the bottom space 690. The absorbing filter pad device 100 comprises a first middle layer 120a and a second middle layer 120b; an absorbent gasket 130 sandwiched between the first middle layer 120a and the second middle layer 120b; a first outer layer 110a and a second outer layer 110b, the outer layers 110 sandwich the middle layers 120 and gasket 130; and a first border 151 disposed on a first side edge, a second border 152 disposed on a second side edge, a third border 153 disposed on a third side edge of, and a fourth border 154 disposed on a fourth side edge, wherein the outer layers are constructed to resemble a mesh or a screen, the middle layers 120 are constructed from a material comprising a sponge-like material, a batting material, or a diaper material, and the gasket 130 is constructed from a material comprising a fusible non-woven interfacing, wherein the absorbing filter pad device 100 is adapted to slide in and out of the slot 680 in the serving tray 610.

In some embodiments, the serving tray 610 comprises a lid 630 removably attachable to the serving tray 610 over the open top, the lid 630 can move between at least an open position and a closed position respectively allowing and preventing access to the inner cavity of the serving tray 610. In some embodiments, a handle 635 is disposed on the lid 630. In some embodiments, retractable legs 650 are disposed on the bottom surface 616 of the serving tray 610.

In some embodiments, the absorbing filter pad device 100 is circular or rectangular. In some embodiments, the outer layers 110 are metal wire mesh screens. In some embodiments, the outer layers are constructed from a materials including aluminum, brass, copper, polyester fabric, or polyester therephthalate (PET). In some embodiments, the outer layers 110 are constructed from non-woven material. In some embodiments, the outer layers 110 are constructed from a material comprising wood fiber or cellulose fiber.

DESCRIPTION OF PREFERRED EMBODIMENTS

Referring now to FIG. 1-5, the present invention features an absorbing filter pad device 100, which can be used for a variety of purposes (see Summary above) including but not limited to removing excess oil or fluid from foods. Either side of the device 100 can be used.

Figure 5:
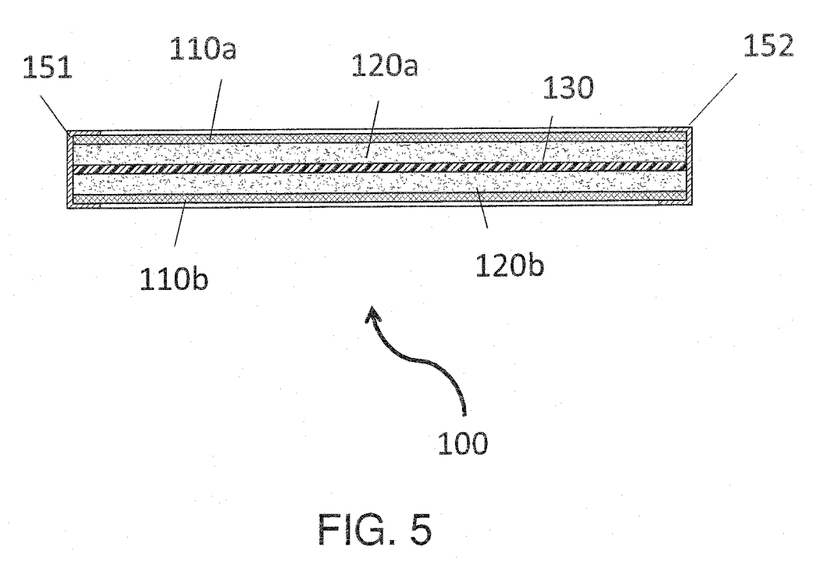
FIG. 5 is a cross sectional view of the absorbing filter pad device of the present invention. The two outer layers, the two middle layers, the absorbent gasket, and borders are shown in FIG. 5.

The absorbing filter pad device 100 of the present invention comprises a first outer layer 110a (e.g., a top layer or top cover), a second outer layer 110b (e.g., a bottom layer or bottom cover), a first middle layer 120a, a second middle layer 120b, and an absorbent gasket 130. The absorbent gasket 130 is sandwiched between the first middle layer 120a and second middle layer 120b. The absorbent gasket 130, the first middle layer 120a, and the second middle layer 120b are together sandwiched between the first outer layer 110a and second outer layer 110b.

The absorbent gasket 130 provides enhanced absorbent capacity. Placing the absorbent gasket 130 between the two middle layers 120 may increase the ability of the middle layers 130 to absorb more liquid (e.g., oil) The absorbent gasket 130 may help to pull oil or other liquid from the middle layers 120 in the event that the middle layers 120 are full.

The device 100 has a first side edge, a second side edge, a third side edge, and a fourth side edge. Disposed on the first side edge is a first border 151, disposed on the second side edge is a second border 152, disposed on the third side edge is a third border 153, and disposed on the fourth side edge is a fourth border 154.

The absorbing filter device 100 may be constructed in a variety of shapes and sizes. For example, in some embodiments, the absorbing filter device 100 is constructed in a square or rectangular shape. In some embodiments, the absorbing filter device 100 is constructed in a circular, oval shape, other geometric shape, or irregular shape. The present invention is not limited to the aforementioned shapes.

As used herein, the term "about" refers to plus or minus 10% of the referenced number.

In some embodiments, the absorbing filter pad device 100 is between about 8 to 12 inches in length as measured from the first border 151 to the second border 152. In some embodiments, the absorbing filter pad device 100 is between about 12 to 16 inches in length as measured from the first border 151 to the second border 152. In some embodiments, the absorbing filter pad device 100 is between about 16 to 20 inches in length as measured from the first border 151 to the second border 152. In some embodiments, the absorbing filter pad device 100 is between about 20 to 24 inches in length as measured from the first border 151 to the second border 152. In some embodiments, the absorbing filter pad device 100 is more than about 24 inches in length.

In some embodiments, the first outer layer 110a is attached to the first middle layer 120a via an attachment means (e.g., a glue, a stitching, the like). In some embodiments, the second middle layer 120b is attached to the second outer layer 110b via an attachment means (e.g., a glue, a stitching, the like).

The first outer layer 110a and the second outer layer 110b are constructed to resemble a screen or sieve. In some embodiments, the first outer layer 110a and the second outer layer 110b are aluminum wire mesh screens. In some embodiments, the outer layers are constructed from materials including but not limited to metal, aluminum, brass, copper, numex, polymers, polyester fabric, polyester therephthalate (PET), film with holes or slits, polymer film with holes or slits. In some embodiments, the outer layers 110 are constructed from non-woven material in some embodiments, the outer layers 110 are constructed from a mesh-like material. In some embodiments, the outer layers 110 are constructed from a material comprising wood fiber and/or cellulose fiber. The outer layers 110 can be manipulated into screens or films with openings such as holes and slots and pores. For example, materials may be made into a screen and then fitted with sizable holes and/or slits (e.g., forming a wire mesh). The present invention is not limited to the aforementioned materials for constructing the outer layers 110.

In some embodiments, the middle layers 120 (e.g., sponges) are constructed from an absorbing material such as batting (e.g., fluff-batt, fluff material). Examples of batting include diaper innards and/or cloth. Diaper materials are well known to one of ordinary skill in the art. In some embodiments, the middle layers 120 are constructed from a sponge-like material. In some embodiments, the middle layers 120 are constructed from non-woven material (e.g., loosely arranged fibers).

The device has a thickness to fulfill its designed function. The middle layer 130 may have a thickness of any size. In some embodiments, the borders 151, 152, 153, 154 are constructed from the same material as the outer layers 110 (e.g., screens, film with openings, polymers, metal, and aluminum, non woven material, plastic, or wire mesh, etc.). In some embodiments the borders have the same thickness as the outer layers 110.

In some embodiments, a user can place the absorbing filter pad device 100 on a plate or on a countertop (or in the holder system 500) and then place his/her food atop the top layer of the absorbing filter pad device 100. The excess grease or liquid is drained from the food through the first outer layer 110a (e.g., top layer, mesh) into the first middle layer 120a (e.g., batt material). In some embodiments, grease or other liquid from the first middle layer 120a (acting like a sponge) drains to the gasket 130 between the two middle layers 120. In some embodiments, the device 100 is flipped over and food is placed atop the second outer layer 110b (with liquid or grease draining into the second middle layer 120b and optionally the gasket 130. In some embodiments, a user can throw away the device 100 after one or several uses. In some embodiments, the device 100 is reusable. In some embodiments, the device 100 is recyclable.

The present invention also features a holder/base tray (a holder system 500). As shown in FIG. 1-4, the holder system 500 comprises a base 510, which resembles a cabinet or drawer chest. Cabinets and drawer chests are well known to one of ordinary skill in the art. For example, the base 510 has an inner cavity adapted to store absorbing filter pad devices 100 (used or unused). In some embodiments, one or more drawers 520 are slidably disposed in the base 510 and can slide in and out of the inner cavity via a first side of the base 510.

Figure 1:
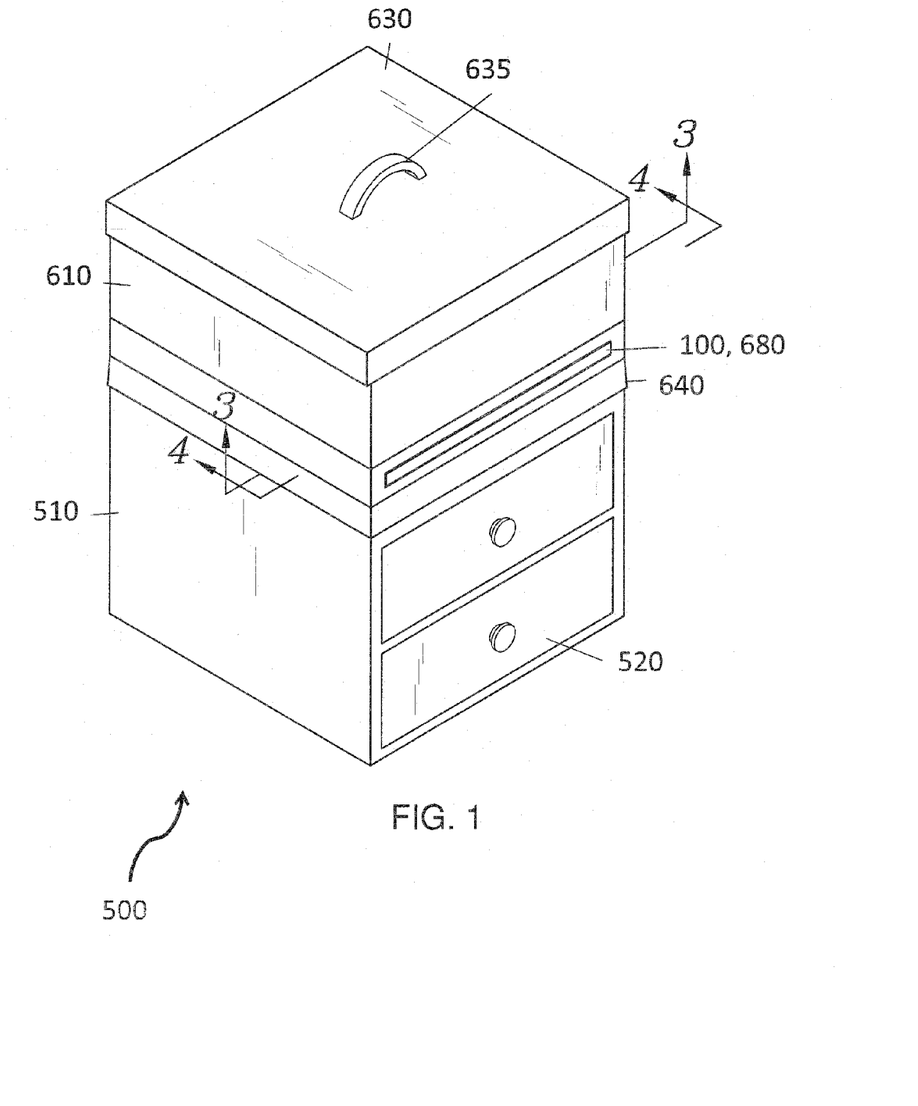
FIG. 1 is a perspective view of the holder system of the present invention.
Figure 2:
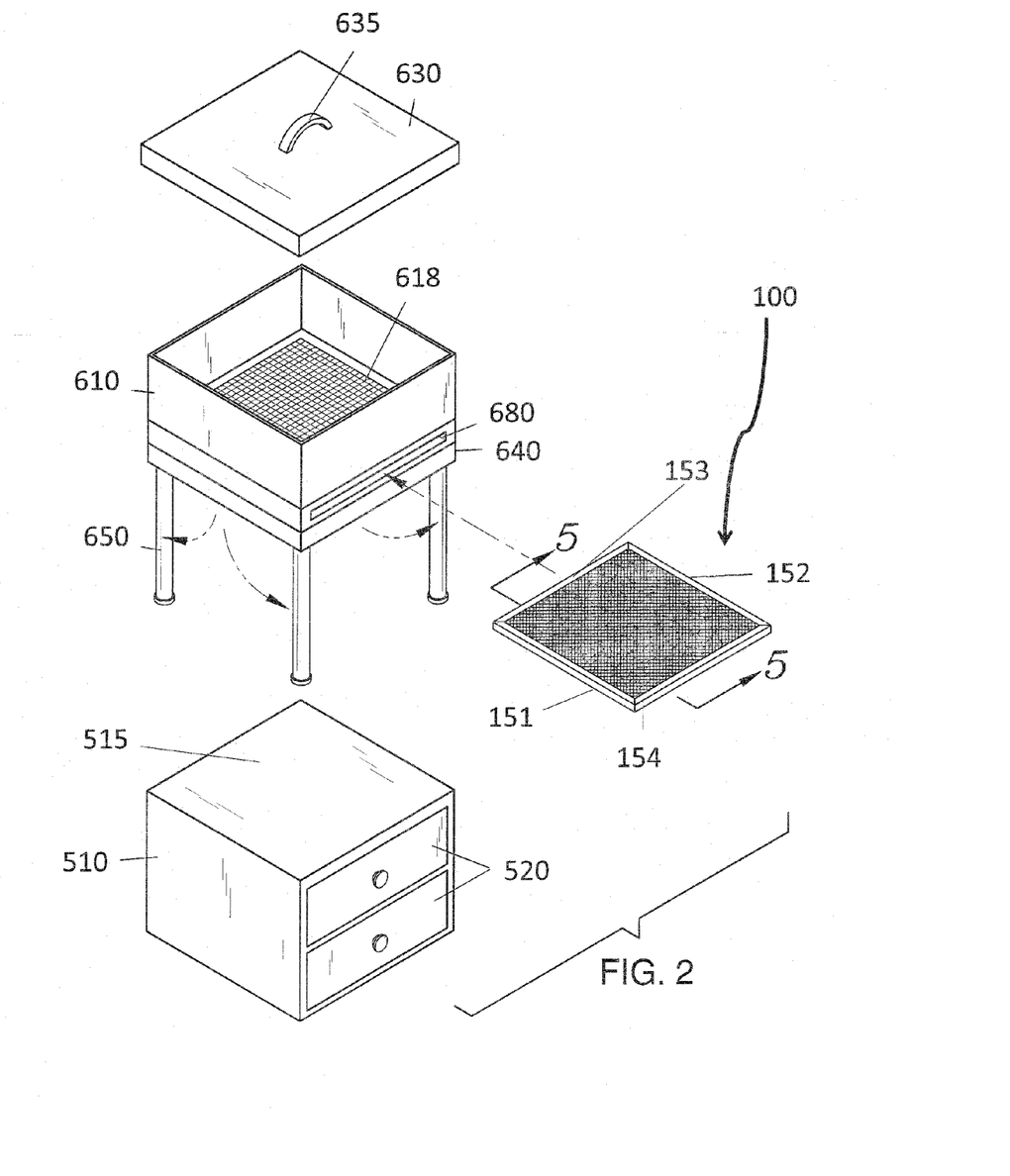
FIG. 2 is an exploded view of the holder system of the present invention. The holder system comprises a serving tray and a base. Also shown in FIG. 2 is the reusable absorbent filter pad device of the present invention.

The holder system 500 further comprises a serving tray 610 adapted to be placed on or attached to the top surface 515 of the base 510. The serving tray 610 has a bottom surface 616, sides, an inner cavity, and an open top. The sides create a basket-like effect for the food. The open top provides access to the inner cavity. In some embodiments, the serving tray 610 comprises a lid 630 removably attachable to the serving tray 610 over the open top. The lid 630 can move between at least an open position and a closed position respectively allowing and preventing access to the inner cavity of the serving tray 610 in some embodiments, a handle 635 is disposed on the lid 630.

Figure 3:
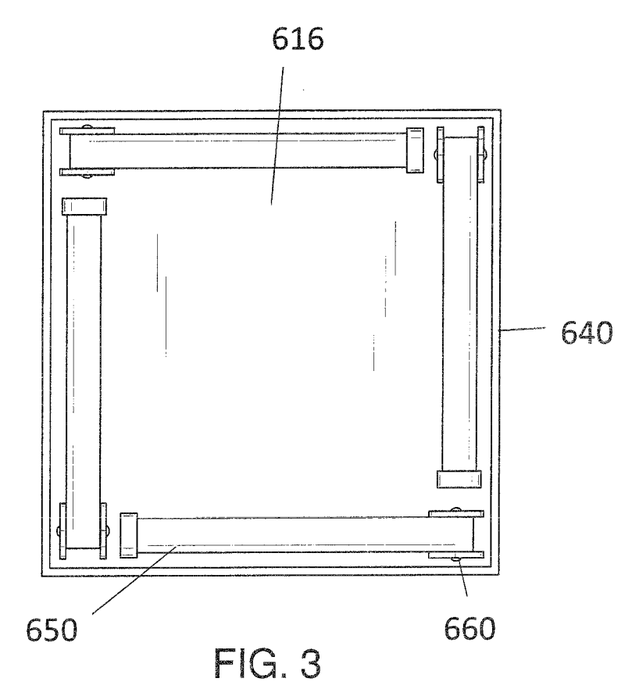
FIG. 3 is a bottom view of the serving tray of the holder system of the present invention.

In some embodiments, retractable legs 650 (e.g., a first retractable leg, a second retractable leg, and a third retractable leg; or a first retractable leg, a second retractable leg, a third retractable leg, and a fourth retractable leg) are disposed on the bottom surface 616 of the serving tray 610. Retractable legs are well known to one of ordinary skill in the art and are commonly found on folding tables, card tables, and the like. For example, the retractable legs 650 pivot via pivot points 660.

Extending downwardly from the outer edges of the bottom surface 616 of the serving tray 610 (or a portion of the outer edges of the bottom surface 616) is a bottom lip 640. The bottom lip 640 engages (e.g., snaps onto) the top surface 515 and/or sides) of the base 510. When the bottom lip 640 engages the base 510, a gap exists between the top surface of the base 510 and the bottom surface of the serving tray 610. The gap provides room for the retractable legs 650 (e.g., see FIG. 4).

Disposed in the inner cavity of the serving tray 610 above the bottom surface 616 is a mesh layer 618. The mesh layer 618 is generally parallel to the bottom surface 616 of the serving tray 610. The mesh layer 618 creates a bottom space between the mesh layer 618 and the bottom surface 616 of the serving tray 610. In some embodiments, the mesh layer 618 is removable. In some embodiments, the mesh layer 618 rests atop notches or lips disposed in the inner cavity of the serving tray 610. The filter pad can be placed inside the serving tray as well as in the slot (bottom space 690) to accommodate more liquid (e.g., grease) simultaneously.

Figure 4:
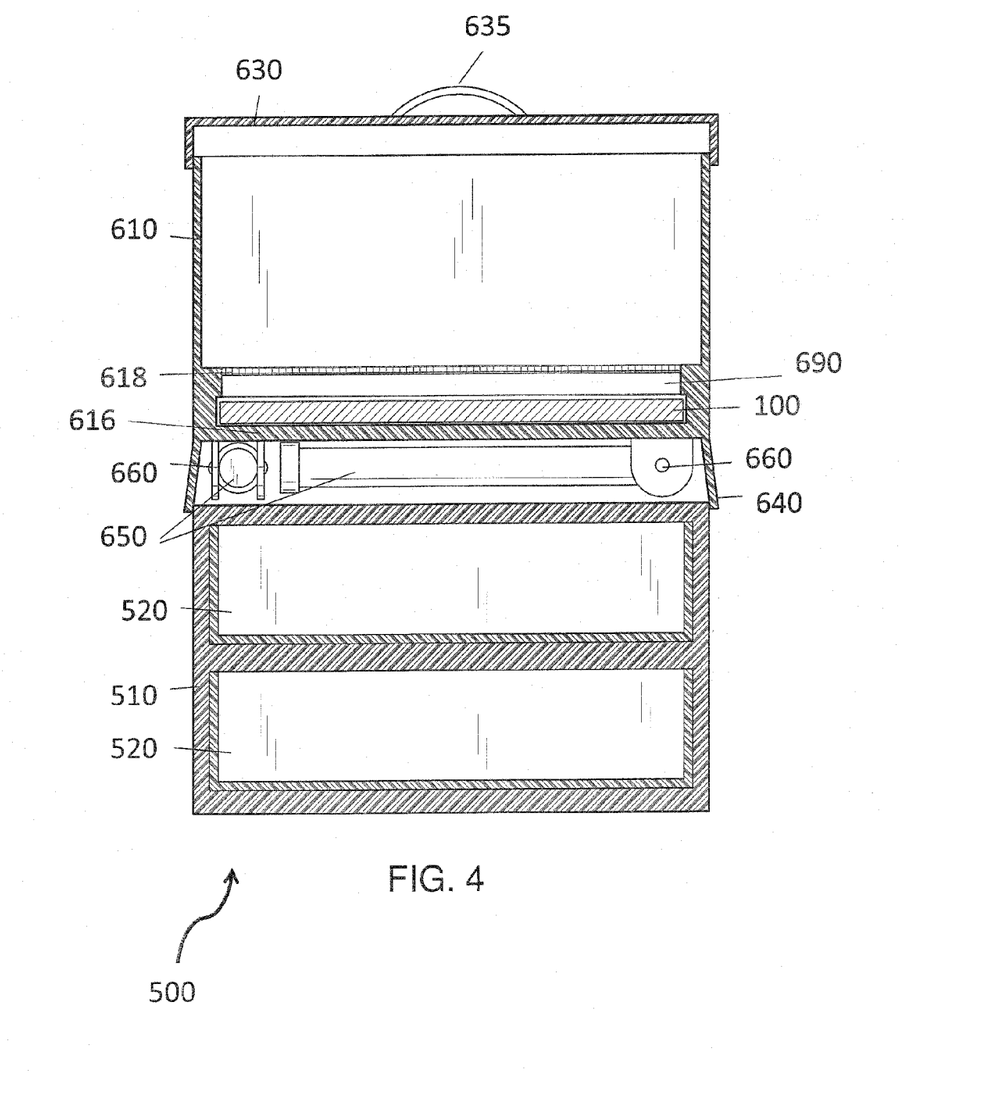
FIG. 4 is a side cross sectional view of the holder system of the present invention.

Disposed in a side of the serving tray 610 near the bottom surface 616 is a slot 680. The slot 680 is positioned adjacent to the bottom space 690 and provides access to the bottom space 690. The slot 680 allows an absorbing filter pad device 100 to be slid in and out of the bottom space 690. FIG. 4 shows an absorbing filter pad device 100 engaged in the bottom space 690.

As an example, a user may remove an absorbing filter pad device 100 from a drawer 520 in the base 510 and insert it into the slot 680 in the serving tray 610. Then, he/she may remove the serving tray 610 from the base 510 and set up the retractable legs 650. Next, the user may place food atop the mesh layer 618, allowing grease or liquid to be absorbed into the absorbing filter pad device 100.

Briefly, the absorbing filter pad device 100 comprises a first middle layer 120a and a second middle layer 120b; an absorbent gasket 130 sandwiched between the first middle layer 120a and the second middle layer 120b; a first outer layer 110a and a second outer layer 110b, the outer layers 110 sandwich the middle layers 120 and gasket 130; and a first border 151 disposed on a first side edge, a second border 152 disposed on a second side edge, a third border 153 disposed on a third side edge of, and a fourth border 154 disposed on a fourth side edge, wherein the outer layers are constructed to resemble a mesh or a screen, the middle layers 120 are constructed from a material comprising a batting material, and the gasket 130 is constructed from a material comprising a fusible non-woven interfacing, wherein the absorbing filter pad device 100 is adapted to slide in and out of the slot 680 in the serving tray 610. Batting material is well known to one of ordinary skill in the art (e.g., blend of cotton, polyester, and wool). Fusible non-woven interfacing is well known to one of ordinary skill in the art (e.g., see Pellon® brand).

Example 1

Example 1 describes the construction steps and supplies for creating the device 100 of the present invention. The present invention is not limited to these supplies and construction steps.

Supplies:
1. 36×25 Phifer Fiberglass or Aluminum Insect Screening (black, grey)
2. Self-Healing Cutting Mat
3. Rotary Blade
4. Double-Sided Tape
5. Fabric Ruler
6. Fusible Pellon non-woven interface material/fabric
7. Roll of Cotton Batting material (e.g., Wal-Mart)
8. Brother brand or Equal Sewing Machine
9. White Sewing Thread (spools of)

Instructions for Construction:
1. place Self-Healing Cutting Mat on a flat surface
2. place fiberglass insect screening on Mat and measure 12×12 in. squares using the Fabric Ruler and cut accordingly with Rotary Blade
3. repeat step 2 with Fusible Pellon fabric/material and with Batting fabric/material
4. Place one 12×12 square of Fiberglass Screen material for bottom layer on the Mat. Then, center one 12×12 square of Batting material on top. Next, place Pellon material atop the Batting Layer to serve as a gasket. Next, another square of Batting material, and on top of that another square of Fiberglass Screening. Align all evenly.
5. Create Borders
  A. Measure and cut a separate sheet of Fiberglass Screening into four 12×12 in. squares, now referred to as border strips.
  B. Adhere Double-Sided tape lengthwise on half of each border strip. Approximately 4-5 slices of Double-Sided Tape intermittently lengthwise-making sure to place a slice near each end.
6. Place Sheet square on top of border strip which has no tape adhered. Note! Important to place square at edge of taped border to keep even. Once aligned, fold taped border over top layer pressing hard to ensure Adhesion. Now, turn square sheet completely over and then repeat double sided tape placement to the other half of the border strip. Fold over and press to adhere. Repeat above steps until each border has been attached.
7. Now utilizing Brother (model) sewing machine-set to low stitch pattern number 2 (two), 3 (three) or preferably 4 (four). Complete stitching on all sides (4). Best if sewn where taped border-ends seal around Wave3. Make sure to overlap stitch pattern at each corner when sewing; this action will complete seal of all fluids in the device, the Recyclable All Climate Multi-Functional Pad/Filter.

Note: two (2) absorbent (middle) layers with gasket were used since top and bottom layers are reusable The following disclosures of the following U.S. patents are incorporated in their entirety by reference herein: U.S. Pat. Application No. 2006/0288999; U.S. Pat. No. 6,274,229; U.S. Pat. No. 6,488,977; U.S. Pat. No. 5,094,869; U.S. Pat. No. 5,414,248; U.S. Pat. Application No. 2002/0185013; U.S. Pat. No. 4,950,524.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A system comprising:
  (a) a holder system 500 comprising:
    (i) a base 510 having an inner cavity and a drawer 520 slidably disposed in a first side of the base 510, the drawer 520 can slide in and out of the inner cavity; and
    (ii) a serving tray 610 having a bottom surface 616, sides, an inner cavity, and an open top, the open top provides access to the inner cavity, a bottom lip 640 extends downwardly from outer edges of the bottom surface 616 of the serving tray 610, the bottom lip 640 engages a top surface 515 of the base 510 forming a gap between the top surface of the base 510 and the bottom surface of the serving tray 610, a mesh layer 618 is disposed in the inner cavity of the serving tray 610 above the bottom surface 616 the mesh layer 618 creates a bottom space 690 between the mesh layer 618 and the bottom surface 616 of the serving tray 610, a slot 680 is disposed in a side of the serving tray 610 near the bottom surface 616, the slot 680 provides access to the bottom space 690, and
  (b) an absorbing filter pad device 100 comprising:
    (a) a first middle layer 120a and a second middle layer 120b,
    (b) an absorbent gasket 130 sandwiched between the first middle layer 120a and the second middle layer 120b;

(c) a first outer layer 110*a* and a second outer layer 110*b* the outer layers 110 sandwich the middle layers 120 and gasket 130; and (d) a first border 151 disposed on a first side edge, a second border 152 disposed on a second side edge, a third border 153 disposed on a third side edge of, and a fourth border 154 disposed on a fourth side edge, wherein the outer layers are constructed to resemble a mesh or a screen, the middle layers 120 are constructed from a material comprising a batting material, and the gasket 130 is constructed from a material comprising a fusible non-woven interfacing, wherein the absorbing filter pad device 100 is adapted to slide in and out of the slot 680 in the serving tray 610.

2. The system of claim 1, wherein the serving tray 610 comprises a lid 630 removably attachable to the serving tray 610 over the open top, the lid 630 can move between at least an open position and a closed position respectively allowing and preventing access to the inner cavity of the serving tray 610.

3. The system of claim 2, wherein a handle 635 is disposed on the lid 630.

4. The system of claim 2, wherein retractable legs 650 are disposed on the bottom surface 616 of the serving tray 610.

5. The system of claim 1, wherein the absorbing filter pad device 100 is circular or rectangular.

6. The system of claim 1, wherein the outer layers 110 are metal wire mesh screens.

7. The system of claim 1, wherein the outer layers are constructed from a materials including aluminum, brass, copper, polyester fabric, or polyester therephthalate (PET).

8. The system of claim 1, wherein the outer layers 110 are constructed from a material comprising wood fiber or cellulose fiber.

9. An absorbing filter pad device 100 comprising:

(a) a first middle layer 120*a* and a second middle layer 120*b*;

(b) an absorbent gasket 130 sandwiched between the first middle layer 120*a* and the second middle layer 120*b*;

(c) a first outer layer 110*a* and a second outer layer 110*b*, the outer layers 110 sandwich the middle layers 120 and gasket 130; and (d) a first border 151 disposed on a first side edge, a second border 152 disposed on a second side edge, a third border 153 disposed on a third side edge of, and a fourth border 154 disposed on a fourth side edge;

wherein the outer layers are constructed to resemble a mesh or a screen, the middle layers 120 are constructed from a material comprising a batting material, and the gasket 130 is constructed from a material comprising a fusible non-woven interfacing.

10. The device of claim 9, wherein the device 100 is circular or rectangular.

11. The device 100 of claim 9, wherein the outer layers 110 are metal wire mesh screens.

12. The device 100 of claim 9, wherein the outer layers are constructed from a materials including aluminum, brass, copper, polyester fabric, or polyester therephthalate (PET).

13. The device 100 of claim 9, wherein the outer layers 110 are constructed from a material comprising wood fiber or cellulose fiber.

14. A holder system 500 comprising:

(a) a base 510 having an inner cavity and a drawer 520 slidably disposed in a first side of the base 510, the drawer 520 can slide in and out of the inner cavity; and (b) a serving tray 610 having a bottom surface 616, sides, an inner cavity, and an open top, the open top provides access to the inner cavity, a bottom lip 640 extends downwardly from outer edges of the bottom surface 616 of the serving tray 610, the bottom lip 640 engages a top surface 515 of the base 510 forming a gap between the top surface of the base 510 and the bottom surface of the serving tray 6101 a mesh layer 618 is disposed in the inner cavity of the serving tray 610 above the bottom surface 616, the mesh layer 618 creates a bottom space 690 between the mesh layer 618 and the bottom surface 616 of the serving tray 610, a slot 680 is disposed in a side of the serving tray 610 near the bottom surface 616, the slot 680 provides access to the bottom space 690.

15. The system of claim 14, wherein the serving tray 610 comprises a lid 630 removably attachable to the serving tray 610 over the open top, the lid 630 can move between at least an open position and a closed position respectively allowing and preventing access to the inner cavity of the serving tray 610.

16. The system of claim 15, wherein a handle 635 is disposed on the lid 630.

17. The system of claim 15, wherein retractable legs 650 are disposed on the bottom surface 616 of the serving tray 610.

* * * * *